United States Patent Office 3,520,910
Patented July 21, 1970

---

3,520,910
ORGANOTIN AMINOCARBAMATES
Guenther F. Lengnick and Kailash Chandra Pande, Manitou Beach, Mich., assignors, by mesne assignments, to Stauffer-Wacker Silicone Corporation, a corporation of Delaware
No Drawing. Filed Dec. 23, 1966, Ser. No. 604,139
Int. Cl. C07f 7/22
U.S. Cl. 260—429.7         10 Claims

ABSTRACT OF THE DISCLOSURE

The organo-substituted tin aminocarbamates which are obtained from the condensation of organic isocyanates and oximo or organo aminooxy stannanes are useful as catalysts for curing silicone rubbers and preparing urethane foams.

---

This invention relates to a new class of organotin compounds.

These compounds have been found particularly useful as catalysts in the room temperature curing of silicone rubbers derived from hydroxy-terminated methylpolysiloxane fluids. They are applicable also as intermediates and as catalysts in the preparation of urethane foams.

A compound conforming to the invention may be considered an organo-substituted tin aminocarbamate wherein the tin atom is linked to the carbamic nitrogen atom, by which is meant the nitrogen atom corresponding to the nitrogen atom in carbamic acid ($NH_2COOH$). Alternatively, such a compound may be defined as a fully substituted stannane comprising one or both of the groups $$\underset{R}{N-CO_2N=CRR} \quad \text{or} \quad \underset{R}{N-CO_2-NRR}$$

in which R is a hydrocarbon group, as alkyl or aryl.

In general, the compounds herein are embraced by the type formula

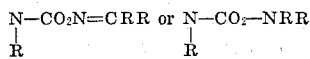

in which R is a hydrocarbon group, X is from the class $=CRR$ and $—RR$ (where R again is a hydrocarbon group), and R' is selected from the class consisting of hydrocarbon groups, oximo groups, diorganoaminooxy groups, the halogens, alkoxy groups, and

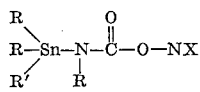

where R and X have the same significance as before indicated. For use as catalysts in the above-mentioned applications, the compounds preferred are those in which each of the R's connected to the tin is a butyl radical and R' is chlorine.

The compounds of the invention are for the most part condensation products of alkyl and aryl isocyanates with mono- and bis-ketoximo and diorganoaminooxy stannanes:

$R_3Sn(ON=CRR) + RNCO \longrightarrow R_3SnN-CO_2N=CRR$
$\phantom{R_3Sn(ON=CRR) + RNCO \longrightarrow R_3SnN-CO_2N=CR}|$
$\phantom{R_3Sn(ON=CRR) + RNCO \longrightarrow R_3SnN-CO_2N=CRRR}R$ $R_2Sn(ON=CRR)_2 + RNCO \longrightarrow R_2Sn-N-CO_2N=CRR$
$\phantom{R_2Sn(ON=CRR)_2 + RNCO \longrightarrow}RRC=NO\phantom{-}R$

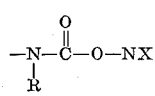

$R_2Sn(ON=CRR)Cl + RNCO \longrightarrow R_2Sn-NCO_2N=CRR$
$\phantom{R_2Sn(ON=CRR)Cl + RNCO \longrightarrow R_2Sn-NCO_2N=CR}Cl\phantom{-}R$ $R_2Sn(ON=CRR)OR + RNCO \longrightarrow R_2Sn-NCO_2N=CRR$
$\phantom{R_2Sn(ON=CRR)OR + RNCO \longrightarrow R_2Sn-NCO_2N=CR}OR\phantom{-}R$ $R_2Sn(ON=CRR)OR + 2RNCO \longrightarrow$
$\phantom{xxxxxxxxx} R_2Sn\text{———}NCO_2N=CRR$
$\phantom{xxxxxxxxxxxxx} R-NCO_2R\phantom{-}R$ $R_3Sn(ONRR) + RNCO \longrightarrow R_3Sn-N-CO_2NRR$
$\phantom{R_3Sn(ONRR) + RNCO \longrightarrow R_3Sn-N-CO_2NR}R$ $R_2Sn(ONRR)_2 + RNCO \longrightarrow R_2Sn-N-CO_2NRR$
$\phantom{R_2Sn(ONRR)_2 + RNCO \longrightarrow}RRNO\phantom{-}R$ $R_2Sn(ONRR)_2 + 2RNCO \longrightarrow R_2Sn(-N-CO_2NRR)_2$
$\phantom{R_2Sn(ONRR)_2 + 2RNCO \longrightarrow R_2Sn(-N-CO_2NRR)_2R}R$ $R_2Sn(ONRR)Cl + RNCO \longrightarrow R_2Sn-N-CO_2NRR$
$\phantom{R_2Sn(ONRR)Cl + RNCO \longrightarrow R_2Sn-N-CO_2NR}Cl\phantom{-}R$ $R_2Sn(ONRR)OR + RNCO \longrightarrow$
$\phantom{xx}½R_2Sn\text{———}NCO_2NRR + ½R_2Sn\text{———}NCO_2R$
$\phantom{xxxxxx}OR\phantom{-}R\phantom{xxxxxxxxxxxx}ONRR\phantom{-}R$

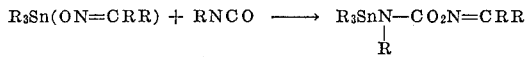

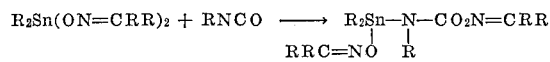

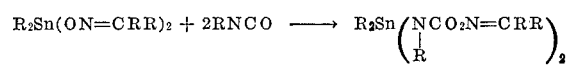

Such reactions are in general carried out to best advantage in the presence of a suitable hydrocarbon solvent as benzene, toluene, ligroin, and the like. The reactions proceed at room temperature, but higher temperatures may be employed to increase the reaction rate. In any case, anhydrous conditions should be maintained throughout the reaction.

The detailed practice of the invention is illustrated by the following examples which are not to be taken as in any way limitative thereof:

EXAMPLE I 7.43 g. of tributylacetoximostannane $(Bu_3SnON=CMe_2)$ was dissolved in 30 ml. of ligroin in a vessel filled with nitrogen and equipped with a magnetic stirrer, addition funnel, reflux condenser and thermometer. Thereafter, an equimolar amount (2.44 g.) of phenylisocyanate, also dissolved in 30 ml. of ligroin, was added slowly over 25 minutes with stirring. A slight temperature rise was noted during the addition which was followed by a one-hour reflux period at a pot temperature of about 70° C. The solvent was then removed in vacuo, leaving a viscous, pale-yellow residue, which was examined spectroscopically. The infrared frequency characteristic of the —N=C=O moiety had entirely disappeared with the development of an ester-type carbonyl frequency. Furthermore, the N.M.R. spectrum was in compliance with the compound

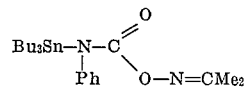

in accordance with the reaction:

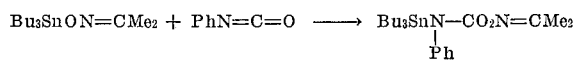

EXAMPLE II

An experiment was performed in which only one oximo group on a dioximo-substituted tin compound was reacted, i.e.,

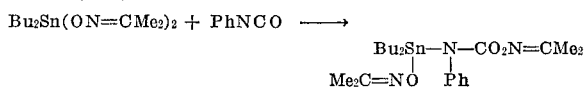

The apparatus was as described in Example I, the order of addition, however, being reversed—a crucial factor. Thus, 3.97 g. (10.6 m. moles) of $Bu_2Sn(ON=CMe_2)_2$ was dissolved in 30 ml. of ligroin and 1.29 g. (10.8 m. moles) of phenylisocyanate in 30 ml. of ligroin thereafter added with stirring. After solvent removal, no N=C=O— was detectable in the infrared spectrum. The N.M.R. spectrum showed that one oximo group, $Me_2C=M—O—$, was still attached to the tin.

EXAMPLE III

The above experiment was repeated, but instead of a 1:1 molar ratio of PhNCO to $Bu_2Sn(ON=CMe_2)_2$, a 2:1 ratio was used. This produced the fully substituted compound

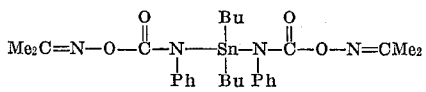

as shown by spectroscopic techniques.

EXAMPLE IV 19.2 g. of $Bu_2Sn(Cl)(ON=CMe_2)$ dissolved in 100 ml. of benzene was introduced into a nitrogen-flushed reaction vessel of the type described previously, and 6.7 g. of phenylisocyanate, also dissolved in benzene, was added dropwise and with rapid stirring. The resultant product was isolated by evaporation of the solvent. Analysis by infrared and N.M.R. techniques proved it to be

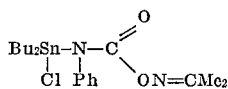

EXAMPLE V

Under conditions similar to those previously detailed n-$Bu_2Sn(OMe)(ON=CMe_2)$ is reacted with an equimolar amount of PhNCO to obtain

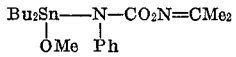

EXAMPLE VI

The reaction:

$Pr_2Sn(OBu)[ON=C(Me)(Et)] + 2EtNCO \longrightarrow$

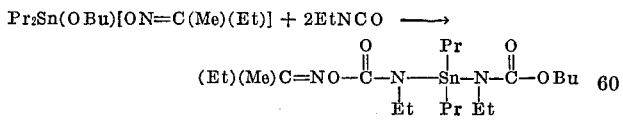

was performed by adding a benzene solution of the tin compound (22.0 g., equivalent to 0.0605 mole) to a similar solution of ethyl isocyanate (8.6 g., 0.121 mole). The reaction mixture was heated at 50° for one hour whereafter an infrared spectrum was taken of the solution. The N=C=O frequencies had disappeared entirely. The N.M.R. spectrum showed shifts for the alkoxy and the ketoximo hydrogens, indicating that these groups had been displaced from the tin atom, yielding as the product

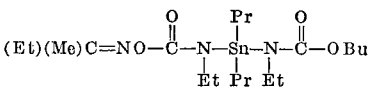

EXAMPLE VII

A hydroxy-terminated dimethylpolysiloxane fluid of 3520 cs. viscosity was intimately blended with a conventional cross-linker, commonly known as Ethyl Silicate 40, in a weight ratio of 100 to 6. To this mixture one gram of the compound prepared according to Example III

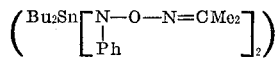

was added with stirring. Elastomeric properties were evident in the product after 20 minutes air-exposure. A fully cured elastomer resulted in 45 minutes. The odor of the rubber was acceptable and the rubber did not have the corrosive properties often encountered with such rubbers when cured using conventional tin catalysts.

EXAMPLE VIII

The procedure described in Example VII was repeated, using only 0.3 g. of catalyst per 100 g. of the hydroxy-terminated polysiloxane fluid. The cure-time was thus markedly slowed, three hours being required to obtain a fully cured rubber.

The two experiments demonstrate that with such a catalyst the cure-time becomes a function of catalyst concentration. This is a desideratum, considering the variance in working periods to be met.

EXAMPLE IX

All of the following were found to be active as curing agents for the rubber prepared as per Example VII:

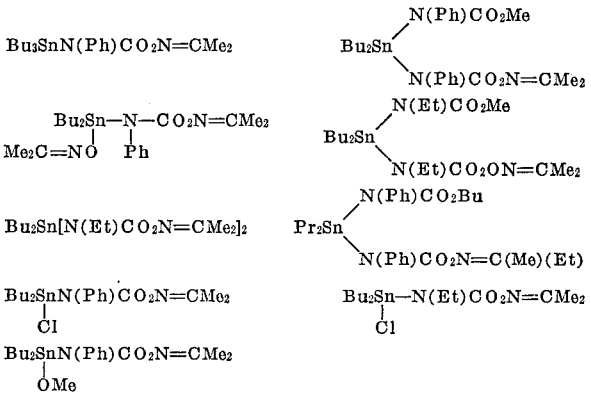

EXAMPLE X

Application of the tin compounds in the production of polyurethane foam:

150 g. of a polypropylene glycol is mixed with 9 g. of methylene chloride in a plastic-coated paper cup by means of a mechanical stirrer. 2.25 g. of a commercial polyurethane surfactant known as L520 is then smoothly blended-in, whereafter 1.0 g. of

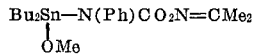

is added, followed by rapid stirring for about 20 seconds. Next, tolylenediisocyanate (63 g.) is poured in rapidly with an additional stirring time of 8 seconds. The resulting foaming mixture is rapidly transferred to a paper mold in which the foam is allowed to rise to full expansion. A 10 minute residence in an oven at 275° F. yields a high-quality expanded form.

EXAMPLE XI

A 50 ml., 3-necked flask was fitted with a magnetic stirrer, reflux condenser, addition funnel, thermometer, and nitrogen inlet. To the nitrogen-flushed apparatus were sequentially added with stirring 3.27 g. of phenylisocyanate in 15 ml. of ligroin and 5.61 g. of $Bu_2Sn(ONEt_2)_2$ in 15 ml. of the same solvent. A 6° C. temperature rise was noted. The molar ratio of the reactants was 2:1, so as to permit of the reaction:

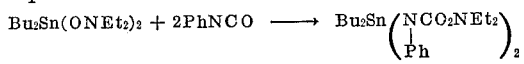

After refluxing and vacuum stripping, the reaction was proved by infrared spectra, which showed the absence of any isocyanate bond and the presence of the characteristic carbonyl bond. The product compound when tested as per Example VII supra was found to be catalytically active.

EXAMPLE XII

When EtNCO and Bu₂Sn(Cl)ONEt₂ in 2:1 molar ratio were reacted in a manner similar to Example XI, one mole equivalent of ethylisocyanate was recovered, evidencing that the Sn-Cl moiety is inert under such conditions. The product

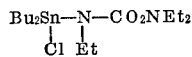

yields an excellent RTV silicone rubber when employed as a curing catalyst.

EXAMPLE XIII

Addition of Bu₂Sn(OMe)ONEt₂ to an excess of phenyl-isocyanate yielded the compound

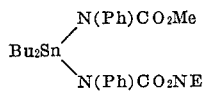

This compound showed activity as a polyurethane catalyst.

EXAMPLE XIV

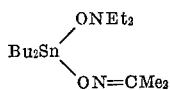

was reacted in a 1:1 molar ratio with phenylisocyanate to obtain

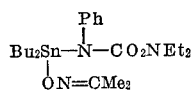

For this result, it appears essential that the isocyanate be added slowly in dilute solution (e.g. toluene) to an equally dilute solution of the tin compound.

EXAMPLE XV

The following compounds were prepared following the usual procedure:

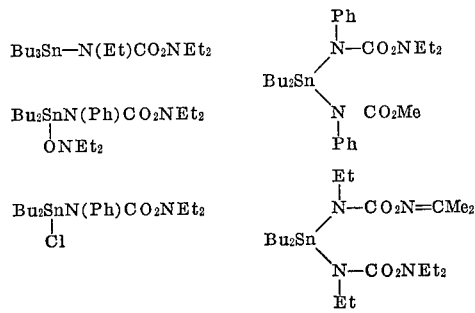

All were active as RTV silicone rubber curing catalysts, although the first-listed compound was less so than the others.

The invention claimed is:

1. A compound conforming the formula

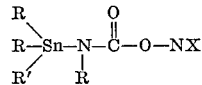

in which R is selected from the class consisting of lower alkyl and aryl groups, X is from the class =CRR and —RR and R' is selected from the class consisting of lower alkyl groups, oximo groups, lower dialkylaminooxy groups, the halogens, alkoxy groups, and

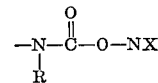

where R and X have the same significance as before indicated.

2. A compound conforming to claim 1 where each of the two R's directly connected to the tin atom is a low molecular weight alkyl group and where the R depending from the nitrogen atom is a phenyl radical.

3. A compound conforming to claim 2 when R' is chlorine.

4. A compound conforming to claim 9 when R' is a butyl radical.

5. A compound conforming to claim 2 when R' is an oximo group.

6. A compound conforming to claim 2 when R' is an alkoxy group.

7. A compound conforming to claim 2 when R' is

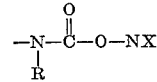

8. A compound conforming to claim 2 when R' is a diethylaminooxy group.

9. A compound in accordance with claim 2 where each of the R's connected to the tin is a butyl radical.

10. A compound in accordance with claim 2 where each of the R's connected to the tin is a butyl radical and R' is

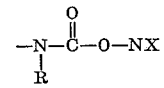

References Cited

UNITED STATES PATENTS

| 3,275,659 | 9/1966 | Weissenberger | 260—429.7 X |
| 3,347,890 | 10/1967 | Davies | 260—429.7 |
| 3,311,647 | 3/1967 | Stamm | 260—429.7 |

TOBIAS E. LEVOW, Primary Examiner

W. F. W. BELLAMY, Assistant Examiner

U.S. Cl. X.R.

252—431; 260—2.5, 46.5

UNITED STATES PATENT OFFICE
CERTIFICATE OF CORRECTION

Patent No. 3,520,910                Dated July 21, 1970

Inventor(s) Guenther F. Lengnick et al.

It is certified that error appears in the above-identified patent and that said Letters Patent are hereby corrected as shown below:

Column 6, line 5, after "conforming" insert -- to --.

Signed and sealed this 20th day of April 1971.

(SEAL)
Attest:

EDWARD M. FLETCHER, JR.　　　　　　WILLIAM E. SCHUYLER, JR.
Attesting Officer　　　　　　　　　Commissioner of Patents